Aug. 10, 1926.

S. E. HORTON 1,595,399

CHUCK

Filed May 29, 1924  2 Sheets-Sheet 1

Inventor:
Sidney E. Horton,
by Emery Booth Janney Varney
Attys

Aug. 10, 1926.

S. E. HORTON 1,595,399

CHUCK

Filed May 29, 1924   2 Sheets-Sheet 2

Inventor:
Sidney E. Horton.
by Emery, Booth, Janney & Varney
Attys.

Patented Aug. 10, 1926.

1,595,399

UNITED STATES PATENT OFFICE.

SIDNEY E. HORTON, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed May 29, 1924. Serial No. 716,790.

My invention relates to chucks and particularly is concerned with the mechanism for operating the work gripping means of a lathe chuck.

My invention will be best understood from the following description when read in light of the accompanying drawings of the specific embodiment of my invention selected for illustrative purposes, while the scope of my invention will be more particularly pointed out in the appended claims.

In the drawings:—

Figure 1:
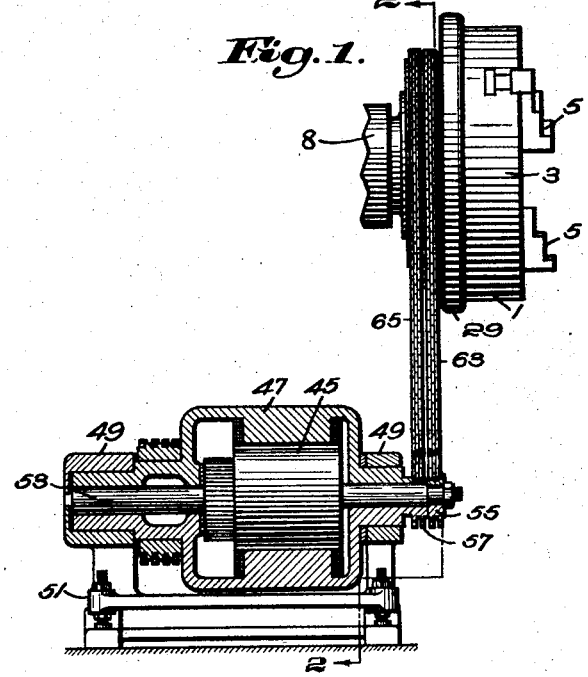
Fig. 1 shows a chuck with an associated motor for actuating the jaws, parts being shown in section.
Figure 2:
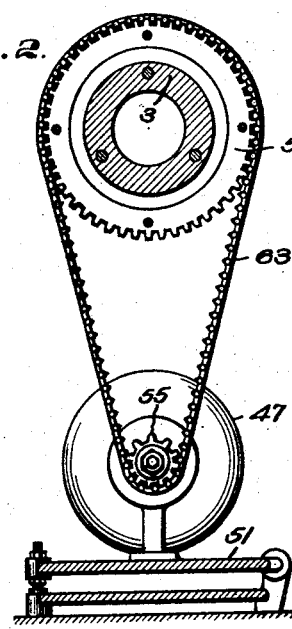
Fig. 2 is a section on the line 2—2 of Fig. 1.
Figure 3:
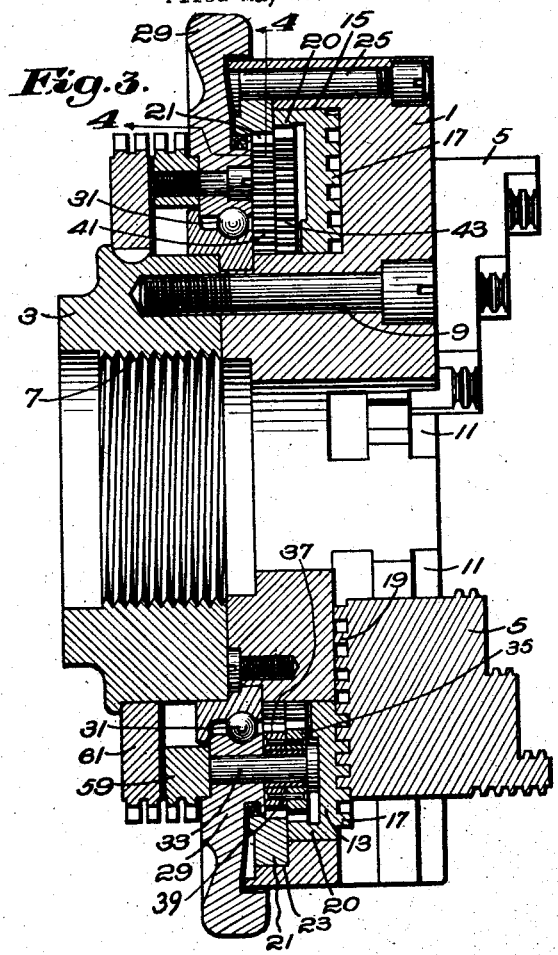
Fig. 3 is a longitudinal section of the chuck.

Referring to the drawings which show the particular embodiment of my invention selected for illustrative purposes, the chuck includes a body having the forward section 1 and the rearward section 3, the former carrying the radially movable jaws 5, and the latter having the internal screw threads 7 for attaching the chuck to the lathe spindle 8. The body sections 1 and 3 of the chuck are held in assembled relation by means of the bolts 9.

The jaws 5 of the chuck are carried in radially disposed guideways 11 formed on the forward face of the forward body section 1. For operating the jaws I provide a scroll wheel 13 which is rotatably mounted in an annular groove 15, the latter being formed in the rearward face of the body section 1 and intersecting the radially disposed guideways 11. The scroll wheel is provided on its forward face with the scroll teeth 17 meshing with cooperating rack teeth 19 formed on the rearward face of the jaws 5. As will be obvious, by this construction when the scroll wheel is rotated the jaws 5 will be caused to move toward or away from the axis of the chuck for gripping or releasing the work, the direction of movement depending upon the direction of rotation of the scroll wheel.

Figure 4:
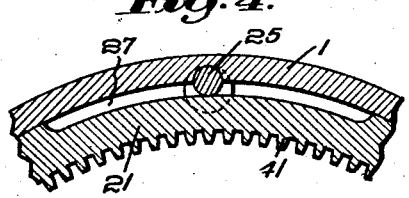
Fig. 4 is a fragmentary section on the line 4—4 of Fig. 3.

For holding the scroll wheel in the annular groove 15 I provide the scroll wheel with a peripheral annular flange 20 which abuts the forward face of a ring 21 carried in the annular enlargement 23 of the annular groove 15. The ring 21 is held in position by means of bolts 25 carried by the chuck body. As indicated by Fig. 4 the peripheral face of the ring 21 adjacent the bolts 25 is provided with arcuate grooves 27 through which the bolts pass, this construction permitting relative rotation between the ring 21 and the body of the chuck, the purpose of which will hereinafter be set forth.

For rotating the scroll wheel I provide a rotary part herein exemplified by a hand wheel 29 rotatably supported by the chuck body on roller bearings 31. The hand wheel is provided with forwardly extending studs 33 (only one of which is shown) which carry differential pinions rotatably mounted thereon. Each pinion comprises a spur gear portion 35 and a slightly smaller spur gear 37, these portions being held from relative rotation by pins 39 riveting the gears together. The spur gear 37 meshes with internal spur gear teeth 41 formed on the ring 21 and the spur gear 35 meshes with internal spur gear teeth 43 formed on the peripheral flange 20 of the scroll wheel. As will be apparent, when the hand wheel 29 is rotated relatively to the body of the chuck the scroll wheel will be rotated by means of the differential gearing just described at a much slower speed, the direction of rotation of the scroll wheel depending upon the direction of rotation of the hand wheel. It will further be noticed that when the chuck is rotated the hand wheel must normally rotate with it by reason of the fact that the connection between the hand wheel and jaws is such that effort must be applied to the hand wheel to cause it to rotate relatively to the chuck body.

The lost motion connection between the ring 21 and the body of the chuck afforded by the grooves 27 permits the hand wheel to be rotated (preferably through more than one revolution) without effecting movement of the chuck jaws, which permits the hand wheel to acquire considerable velocity before the lost motion is taken up, thereby causing the sudden arresting of motion of the hand wheel, when the bolts 25 reach the ends of the grooves 27, to impart a hammer blow to the chuck jaws.

For rotating the chuck jaws by power I preferably provide means so constructed and connected to the chuck that the jaws will be opened and closed relatively to the work at a speed independent of the rate or direction of rotation of the chuck, which is to say that whether the chuck is stationary or rotating in either of opposite directions the jaws will always be moved at the same speed.

To this end in the specific embodiment of my invention I provide a reversible motor of a known type which is provided with a rotary armature 45 and a rotary field 47, the field as shown being mounted in bearings 49 at opposite ends of the base 51 of the motor, and the armature being carried by a shaft 53 mounted in bearings at the end of the field. When the windings carried by the armature and field are energized the tendency is for the armature and field to rotate in opposite directions, or if one is held stationary for the other alone to rotate.

In the specific embodiment of my invention disclosed I provide a sprocket wheel 55 keyed to the end of the armature shaft 53 and a similar sprocket wheel 57 carried by the end of the rotary field piece. In the same plane as the sprocket wheel 55 I provide a sprocket wheel 59 carried by the hand wheel 29, and in the same plane as the sprocket wheel 57 I provide a sprocket wheel 61 keyed to the portion 3 of the body of the chuck. About the sprocket wheels 55 and 59 is passed a chain 63 and about the sprocket wheels 57 and 61 a chain 65.

As will be apparent when the chuck is rotated and the motor is not energized the chuck will drive the armature and field of the motor in the same direction and at the same speed. When the motor is energized the armature will rotate the hand wheel 29 relatively to the chuck body, and as the field of the motor is rotated at a fixed speed relatively to the chuck body the rotation of the hand wheel relatively to the chuck body will be the same no matter what the speed of rotation of the chuck. By causing the armature to rotate in one or the other of opposite directions relatively to the field the chuck jaws may be opened or closed.

Under normal conditions when the chuck is stationary energizing of the motor will cause only the hand wheel to rotate and any possible rotation of the chuck can ordinarily be prevented by application of the pressure of the operator's hand to the chuck body, or if desired a brake may be provided for this purpose.

Although I have described for purposes of illustration one specific embodiment of my invention it is to be understood that I am not limited thereby to its particular mechanical details, but that within the scope of my invention wide deviations may be made therefrom without departing from the spirit of my invention.

I claim—

1. The combination with a chuck having a body carrying jaws and jaw operating mechanism, of an electric motor for actuating said jaw operating mechanism, said motor having relatively rotatable rotary field and armature windings, and gearing connecting one of said rotary windings to said body and the other of said windings to said jaw operating mechanism for causing said windings to be normally driven by said chuck at the same speed and in the same direction.

2. The combination with a chuck having a body carrying jaws and jaw operating mechanism, of power mechanism supported independently of said chuck for actuating said jaw operating mechanism, said power mechanism including relatively rotatable parts, and means independently connecting said body and jaw actuating mechanism to said parts for driving said parts without relative rotation, whereby when said power mechanism is energized said parts will be relatively rotated and said jaw operating mechanism will be driven at a rate relatively to said chuck body which is independent of the rate of rotation of said chuck body.

3. The combination with a chuck having a body carrying jaws and jaw operating mechanism, of power mechanism for actuating said jaw operating mechanism, said power mechanism including parts which move relatively to each other when said power mechanism is energized, gearing means connecting said power mechanism to said body and to said jaw operating mechanism for causing said jaw operating mechanism to be driven relatively to said chuck body when said power mechanism is energized, and said gearing means preventing relative movement of said parts of said power mechanism when said chuck is rotating and said power mechanism is not energized.

4. The combination with a chuck having a body carrying jaws and jaw operating mechanism, of a motor for actuating said jaw operating mechanism, said motor having parts which move relatively to each other when said motor is energized, and power transmission means connecting said motor parts to said chuck body and to said jaw operating mechanism for causing the relative movement of said motor parts to actuate said jaw operating mechanism, said power transmission means also preventing such relative movement when said chuck is rotated and said motor mechanism is not energized.

5. The combination with a chuck having a body and jaws and jaw operating mechanism carried by said body, said jaw operating mechanism comprising a member mounted upon said body for rotation, of motor mechanism for actuating said jaw operating mechanism, said motor comprising parts which move relatively to each other when said motor is energized, and gearing operatively connecting said member and body to said parts of said motor for driving said parts without relative rotation when said chuck is rotated.

6. The combination with a chuck having a body and jaws and jaw operating mechanism carried by said body, said jaw operating mechanism comprising a member mounted upon said body for rotation, of motor mechanism for actuating said jaw operating mechanism, said motor comprising rotary parts which rotate relatively to each other when said motor is energized, and gearing operatively connecting said member and body to said parts of said motor for driving said parts without relative rotation when said chuck is rotated.

7. The combination with a chuck having a body and jaws and jaw operating mechanism carried by said body, said jaw operating mechanism including a member mounted for rotation coaxially of said chuck, a motor having rotary parts which rotate relatively to each other when said motor is energized, a sprocket and chain connection between said body and one of said rotary parts of said motor, and an independent sprocket and chain connection between said member and another of said rotary parts of said motor.

8. The combination with a chuck having a body and jaws and jaw operating mechanism carried by said body, said jaw operating mechanism including a member mounted for rotation coaxially of said chuck, a motor having rotary parts which rotate relatively to each other when said motor is energized, a sprocket and chain connection between said body and one of said rotary parts of said motor, and an independent sprocket and chain connection between said member and another of said rotary parts of said motor, said sprocket and chain connections causing said chuck to drive said rotary parts of said motor without relative rotation between said rotary parts.

9. The combination with a chuck having a body carrying jaws, of jaw operating mechanism comprising a member rotatable in either of opposite directions relatively to said chuck body, a reversible motor comprising rotary parts rotatable relatively to each other, gearing driving one of said rotary parts for causing it to rotate at a speed proportional to the speed of said chuck body, and gearing for causing said member to drive the other of said rotary parts at the same speed and in the same direction as the other of said rotary parts.

10. The combination with a chuck having a body, work gripping means, and mechanism comprising a part rotatable relatively to said body for actuating said work gripping means, of a motor having rotary parts mounted for rotation in opposite directions, driving means connecting one of said rotary parts of said motor to said body and the other to said part of said mechanism, said driving means causing said rotary parts of said motor to be driven in the same direction by said chuck when said chuck is rotated.

11. The combination with a chuck spindle, of a chuck having a body driven by said spindle, work gripping means, and mechanism comprising a part rotatable relatively to said body for actuating said work gripping means, of a motor having rotary parts mounted for rotation in opposite directions, driving means connecting one of said rotary parts of said motor to said part of said mechanism, driving means for causing the other of said rotary parts of said motor to be driven in fixed relation to the speed of said spindle, and said two driving means causing said rotary parts of said motor to be driven in the same direction when said spindle is rotated.

12. The combination with a chuck having a body, work gripping means, and mechanism comprising a part rotatable relatively to said body for actuating said work gripping means, of a motor having rotary parts mounted for rotation in opposite directions, driving means connecting one of said rotary parts of said motor to said body and the other to said part of said mechanism, said driving means causing said rotary parts of said motor to be driven in the same direction and at the same speed by said chuck when said chuck is rotated.

13. The combination with a chuck spindle, of a chuck having a body driven by said spindle, work gripping means, and mechanism comprising a part rotatable relatively to said body for actuating said work gripping means, of a motor having rotary parts mounted for rotation in opposite directions, driving means connecting one of said rotary parts of said motor to said part of said mechanism, driving means for causing the other of said rotary parts of said motor to be driven in fixed relation to the speed of said spindle, and said two driving means causing said rotary parts of said motor to be driven in the same direction and at the same speed when said spindle is rotated.

In testimony whereof, I have signed my name to this specification.

SIDNEY E. HORTON.